(12) United States Patent
Fenton

(10) Patent No.: US 11,136,072 B2
(45) Date of Patent: Oct. 5, 2021

(54) CARGO BODY WITH RECESSED LOGISTICS TRACK

(71) Applicant: STI Holdings, Inc., Stoughton, WI (US)

(72) Inventor: Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 96 days.

(21) Appl. No.: 16/527,395

(22) Filed: Jul. 31, 2019

(65) Prior Publication Data

US 2020/0047812 A1   Feb. 13, 2020

Related U.S. Application Data

(60) Provisional application No. 62/715,599, filed on Aug. 7, 2018.

(51) Int. Cl.
*B62D 33/04*       (2006.01)

(52) U.S. Cl.
CPC ...... *B62D 33/046* (2013.01); *B60Y 2200/148* (2013.01)

(58) Field of Classification Search
CPC ........................... B62D 33/046; B62D 29/045
USPC ....................................................... 296/186.1
See application file for complete search history.

(56) References Cited

U.S. PATENT DOCUMENTS

| 2,934,372 A | 4/1960 | Jewell et al. |
| 3,319,585 A | 5/1967 | Pulcrano |
| 3,815,500 A | 6/1974 | Glassmeyer |
| 3,842,755 A | 10/1974 | Carr |
| 3,842,756 A | 10/1974 | Marulic |
| 4,266,897 A | 5/1981 | Jensen |
| 4,344,995 A | 8/1982 | Hammer |
| 4,437,699 A | 3/1984 | Lewis et al. |

(Continued)

FOREIGN PATENT DOCUMENTS

EP          0424083 A1     10/1990

OTHER PUBLICATIONS

Whiting airCELL Panels product brochure, publicly available and offered for sale prior to Jun. 4, 2014 (6 pages).

(Continued)

*Primary Examiner* — Jason S Morrow
(74) *Attorney, Agent, or Firm* — Michael Best & Friedrich LLP

(57) ABSTRACT

A cargo body panel includes an interior side, an exterior side, a primary recess, a secondary recess positioned within the primary recess, and a logistics track. The interior side defines an interior plane. The exterior side defines an exterior plane. The primary recess includes a primary recess interior side defining a primary recess interior plane and a primary recess exterior side defining a primary recess exterior plane. The primary recess interior plane is recessed from the interior plane in a direction toward the exterior plane. The secondary recess includes a secondary recess interior side defining a secondary recess interior plane and a secondary recess exterior side defining a secondary recess exterior plane. A distance between the secondary recess interior plane and the interior plane is greater than a distance between the primary recess interior plane and the interior plane. The secondary recess exterior plane is non-coplanar with the exterior plane.

14 Claims, 10 Drawing Sheets

(56) References Cited

U.S. PATENT DOCUMENTS

| | | | |
|---|---|---|---|
| 4,940,279 A | 7/1990 | Abott et al. | |
| 5,066,066 A | 11/1991 | Yurgevich et al. | |
| 5,286,079 A | 2/1994 | Zubko et al. | |
| 5,678,715 A | 10/1997 | Sjostedt et al. | |
| 5,683,525 A | 11/1997 | Kemp et al. | |
| 5,860,693 A | 1/1999 | Ehrlich | |
| 5,934,742 A | 8/1999 | Fenton et al. | |
| 5,988,074 A | 11/1999 | Thoman | |
| 5,997,076 A | 12/1999 | Ehrlich | |
| 6,000,342 A | 12/1999 | Thoman et al. | |
| 6,003,932 A | 12/1999 | Banerjea et al. | |
| 6,010,020 A | 1/2000 | Abal | |
| 6,106,205 A | 8/2000 | Haire | |
| 6,220,651 B1 * | 4/2001 | Ehrlich | B62D 25/02 296/186.1 |
| 6,412,854 B2 | 7/2002 | Ehrlich | |
| 6,450,564 B1 | 9/2002 | Sill | |
| 6,527,335 B1 | 3/2003 | Yurgevich | |
| 6,578,902 B2 | 6/2003 | Sill | |
| 6,607,237 B1 | 8/2003 | Graaff et al. | |
| 6,626,622 B2 | 9/2003 | Zubko | |
| 6,742,974 B2 | 6/2004 | Haire | |
| 6,893,075 B2 | 5/2005 | Fenton et al. | |
| 6,959,959 B1 | 11/2005 | Roush | |
| 7,014,253 B2 | 3/2006 | Oren | |
| 7,017,253 B1 | 3/2006 | Riggle | |
| 7,069,702 B2 | 7/2006 | Ehrlich | |
| 7,100,971 B2 | 9/2006 | Pines | |
| 7,152,912 B1 | 12/2006 | Roush et al. | |
| 7,422,270 B2 | 9/2008 | Graaff et al. | |
| 7,461,888 B2 | 12/2008 | Brown | |
| 7,500,713 B2 | 3/2009 | Riley et al. | |
| 7,527,325 B2 | 5/2009 | Yurgevich | |
| 7,540,085 B2 | 6/2009 | Fenton et al. | |
| 7,588,286 B2 | 9/2009 | Lewallen et al. | |
| 7,621,589 B1 | 11/2009 | Gerome | |
| 7,704,026 B2 | 4/2010 | Roush et al. | |
| 7,762,618 B2 | 7/2010 | Lewallen | |
| 7,798,753 B2 | 9/2010 | Yurgevich | |
| 7,862,103 B2 | 1/2011 | Riley et al. | |
| 7,931,328 B2 | 4/2011 | Lewallen et al. | |
| 8,006,386 B2 | 8/2011 | Ehrlich | |
| 8,016,152 B2 | 9/2011 | Roush et al. | |
| 8,056,960 B2 | 11/2011 | Brown | |
| 8,186,747 B2 | 5/2012 | Bloodworth et al. | |
| 8,419,110 B2 | 4/2013 | Katz et al. | |
| 8,424,958 B2 | 4/2013 | Wylezinski et al. | |
| 8,506,221 B2 | 8/2013 | Pattison et al. | |
| 8,540,099 B2 | 9/2013 | Roush | |
| 8,652,382 B2 | 2/2014 | Eggert et al. | |
| 8,720,974 B2 | 5/2014 | Hurst et al. | |
| 8,998,295 B2 | 4/2015 | Katz et al. | |
| 9,242,591 B2 | 1/2016 | Ehrlich | |
| 9,314,875 B2 | 4/2016 | Stephan | |
| 9,884,660 B2 | 2/2018 | Fenton | |
| 9,884,661 B2 | 2/2018 | Fenton | |
| 9,944,334 B1 | 4/2018 | Kaufmann | |
| 10,118,653 B2 | 11/2018 | Fenton | |
| 10,266,098 B1 | 4/2019 | Cox et al. | |
| 10,564,018 B2 | 2/2020 | Fenton | |
| 10,584,992 B2 | 3/2020 | Fenton | |
| 2003/0184120 A1 | 10/2003 | Buchholz et al. | |
| 2008/0134509 A1 | 6/2008 | Lewallen et al. | |
| 2008/0292898 A1 | 11/2008 | Straza | |
| 2009/0053548 A1 | 2/2009 | Straza | |
| 2011/0204678 A1 * | 8/2011 | Katz | B62D 65/02 296/186.1 |
| 2013/0224419 A1 | 8/2013 | Lee et al. | |
| 2013/0330521 A1 | 12/2013 | Ebnoether | |
| 2015/0044494 A1 | 2/2015 | Ebnoether | |
| 2015/0078804 A1 * | 3/2015 | Ehrlich | B60P 7/0807 403/10 |
| 2015/0353138 A1 | 12/2015 | Fenton | |
| 2017/0036415 A1 | 2/2017 | Ebnoether et al. | |
| 2017/0057561 A1 | 3/2017 | Fenton | |
| 2017/0057562 A1 | 3/2017 | Fenton | |
| 2018/0015956 A1 | 1/2018 | Jaworski et al. | |
| 2018/0050523 A1 | 2/2018 | Pilpel et al. | |
| 2019/0039344 A1 | 2/2019 | Ebnoether | |
| 2019/0071135 A1 | 3/2019 | Fenton | |
| 2019/0078920 A1 | 3/2019 | Fenton | |

OTHER PUBLICATIONS

TruckingInfo.com, "Trailer Update," downloaded from http://www.truckinginfo.com/article/story/2013/07/trailer-update.aspx, available Jul. 2013, (10 pages).

Trailer-bodybuilders.com, "Mid-America Trucking Show coverage: Newest trailer designs exhibited at MATS," : downloaded from http://trailer-bodybuilders.com/trailers/mid-america-trucking-show-coverage-newest-trailer-, May 1, 2013 (5 pages).

Transport Topics, Whiting Door Licenses Technology to Make Lightweight Steel Panels, downloaded from http://www.ttnews.com/articles/printopt.aspx?storyid=34581, Mar. 31, 2014 (2 pages).

U.S. Appl. No. 16/443,047, filed Jun. 17, 2019 by Gary L. Fenton.

U.S. Appl. No. 16/443,075, filed Jun. 17, 2019 by Gary L. Fenton.

* cited by examiner

US 11,136,072 B2

CARGO BODY WITH RECESSED LOGISTICS TRACK

CROSS REFERENCE TO RELATED APPLICATIONS

The present patent application claims priority to U.S. Provisional Patent Application No. 62/715,599 filed on Aug. 7, 2018, the entire contents of which is hereby incorporated by reference.

BACKGROUND

This disclosure relates to panels such as wall panels for cargo containers, such as over the road trailers, for example. The disclosure further relates to such panels including logistics tracks.

SUMMARY

According to one aspect of the invention, a cargo body panel includes an interior side, an exterior side, a primary recess, a secondary recess positioned within the primary recess, and a logistics track. The interior side defines an interior plane of the cargo body panel for facing a cargo receiving volume of a cargo body constructed with the cargo body panel. The exterior side defines an exterior plane of the cargo body panel. The exterior side is spaced apart from the interior side. The primary recess includes a primary recess interior side defining a primary recess interior plane and a primary recess exterior side defining a primary recess exterior plane. The primary recess interior plane is recessed from the interior plane in a direction toward the exterior plane. The secondary recess includes a secondary recess interior side defining a secondary recess interior plane and a secondary recess exterior side defining a secondary recess exterior plane. A distance between the secondary recess interior plane and the interior plane is greater than a distance between the primary recess interior plane and the interior plane. The secondary recess exterior plane is non-coplanar with the exterior plane. The logistics track includes lateral portions supported by the primary recess interior side. The logistics track spans the secondary recess.

According to another aspect of the invention, cargo body panel including an interior side, an exterior side, a primary recess, a secondary recess positioned within the primary recess, and a logistics track. The interior side faces a cargo receiving volume of a cargo body and is constricted with the cargo body panel. The exterior side is spaced from the interior side. The primary recess includes a primary recess exterior side and a primary recess interior side recessed from the interior side. The distance between the primary recess interior side and the primary recess exterior side defines a thickness. A secondary recess includes a secondary recess interior side and a secondary recess exterior side. A distance between the secondary recess interior side and the secondary recess exterior side defines a thickness. The thickness of the cargo body panel at the primary recess measured between the primary recess interior side and the primary recess exterior side. The logistics track includes lateral portions supported by the primary recess interior side and a central portion spanning the secondary recess. The logistics track is not in contact with the secondary recess interior side.

According to yet another aspect of the invention, a cargo body panel includes an interior side, an exterior side, a primary recess, a secondary recess positioned within the primary recess, and a logistics track. The interior side faces a cargo receiving volume of a cargo body and is constructed with the cargo body panel. The exterior side is spaced from the interior side. The primary recess includes a primary recess interior side and a primary recess exterior side. The primary recess interior side is recessed from the interior side. The secondary recess includes a secondary recess interior side and a secondary recess exterior side. The secondary recess is protruded beyond the exterior side such that a distance between the interior side and the secondary recess interior side is greater than a distance between the interior side and the exterior side. The logistics track includes lateral portions supported by the primary recess interior side. The logistics track spans the secondary recess.

DESCRIPTION

Figure 1:
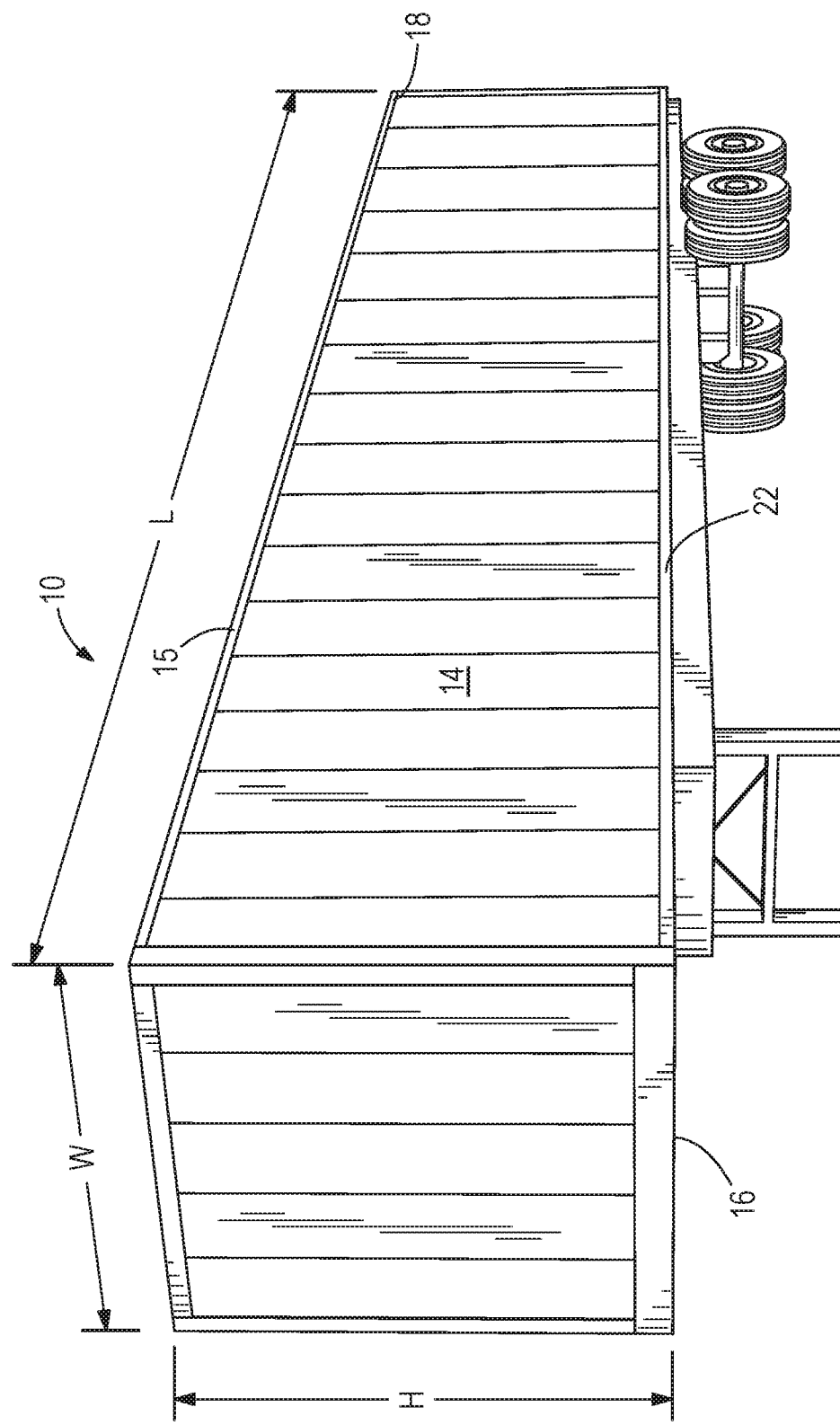
FIG. 1 is a perspective via of a trailer according to an embodiment of the invention.
Figure 2:
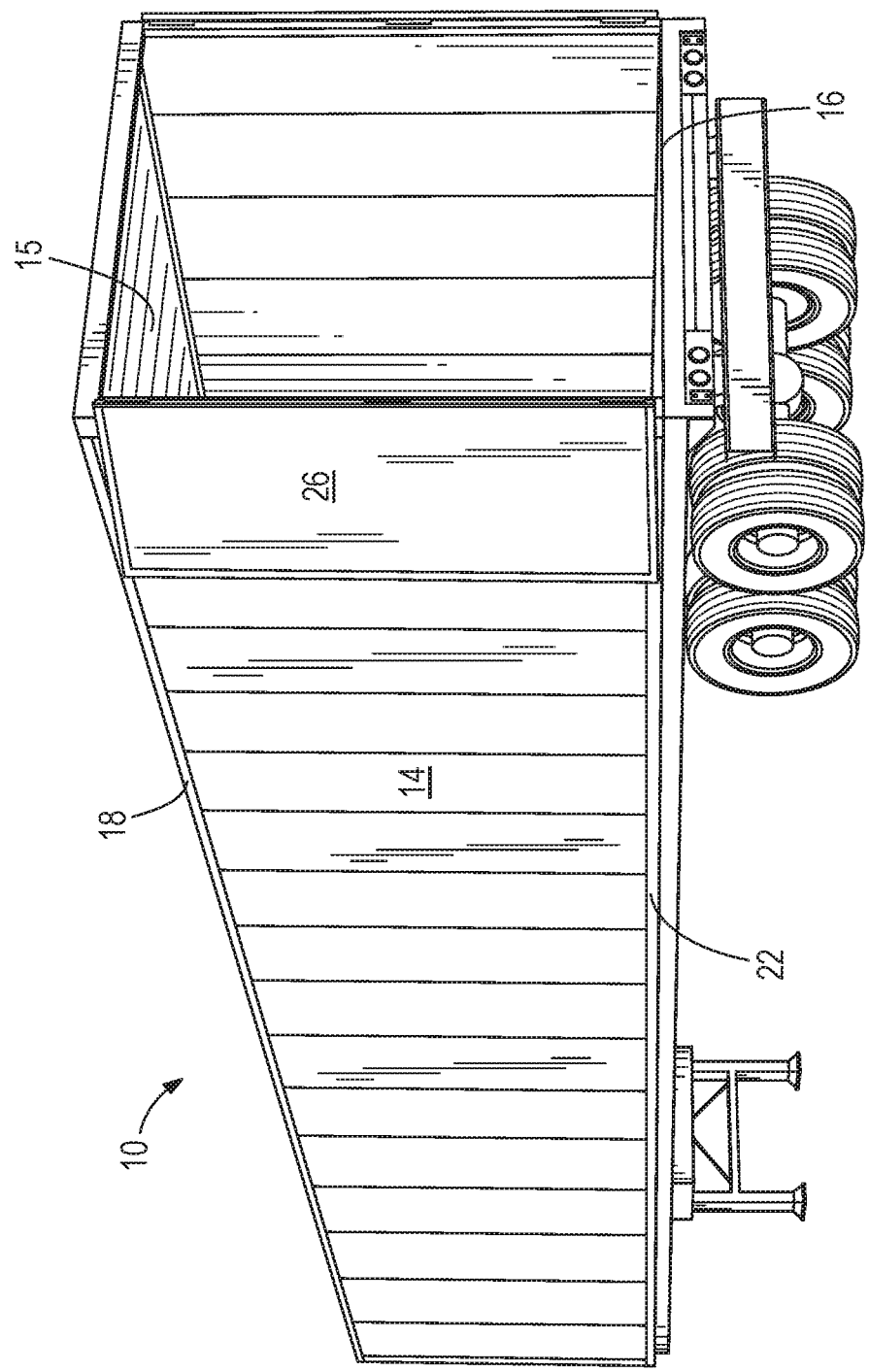
FIG. 2 is an alternate perspective via of the trailer of FIG. 1.

FIGS. 1 and 2 illustrates a trailer 10 as disclosed as disclosed in U.S. Pat. No. 9,884,660 for over-the-road use with a truck to transport large cargo volumes. As shown, the trailer 10 is a semi-trailer configured for use with a road tractor (i.e., in forming a so-called 18-wheeler). The trailer 10 includes a chassis having axles with multiple sets of wheels. The trailer 10 defines a length L in a longitudinal or transport direction. Perpendicular to the longitudinal direction, the trailer 10 defines a width W and a height H. The width W cooperates with the length L to define a plan view footprint of the trailer 10, while the height H is measured perpendicular to the footprint (i.e., perpendicular to the ground). Subtracting for wall thicknesses, the length L, the width W, and the height H cooperate to define a cargo receiving interior volume of the trailer 10. The trailer 10 includes a plurality of walls, including lengthwise sidewalls 14. All of the walls extend between a roof 15 of the trailer 10 and a floor 16 of the trailer 10. As discussed in further detail below, the walls, including the lengthwise sidewalls 14, can be constructed of pairs of panels joined together by joints extending parallel to the direction of the trailer 10 height H between the roof 15 and the floor 16. Top rails 18 and bottom rails 22 are provided to flank and secure the upper and lower edges of each of the panels. At the rear of the trailer 10, at least one door panel 26 is provided to selectively open for accessing the interior cargo volume for loading and unloading.

Figure 3:
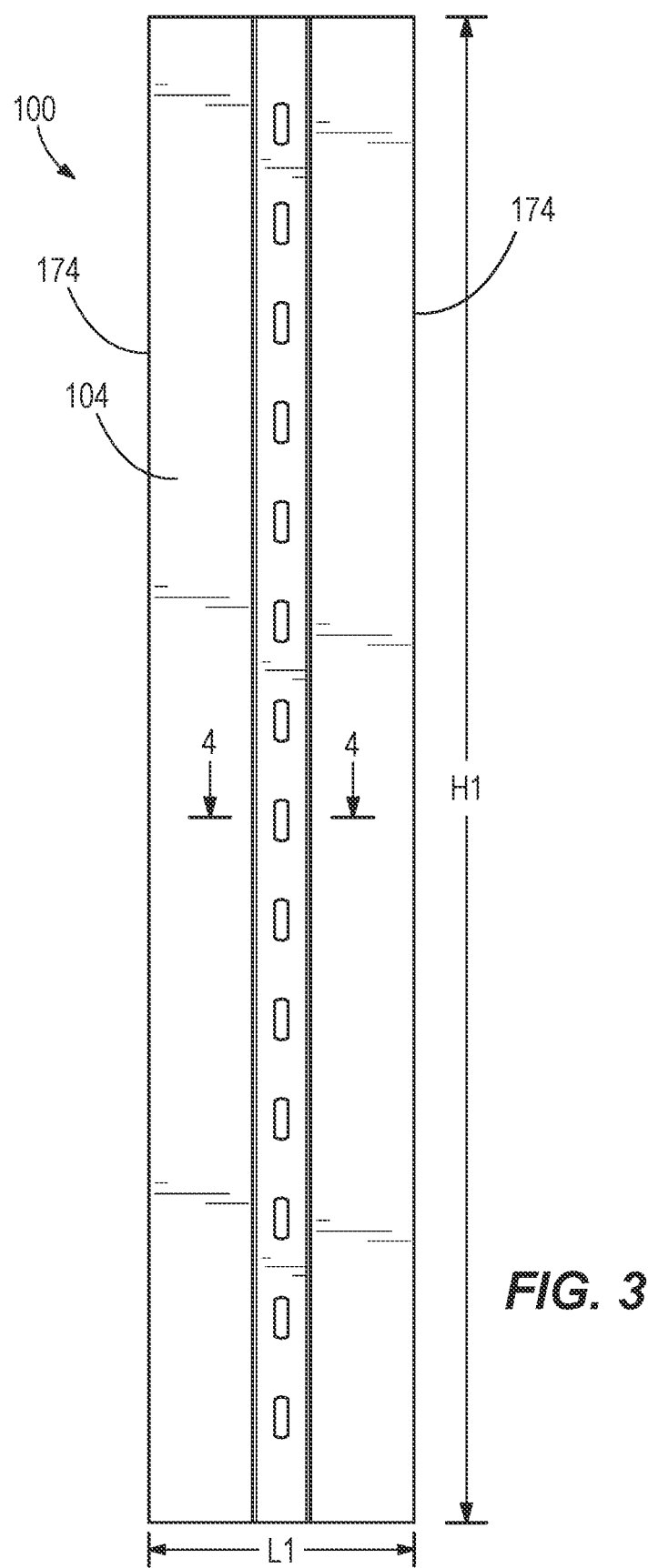
FIG. 3 is a front view of a panel according to an embodiment of the invention.
Figure 4:
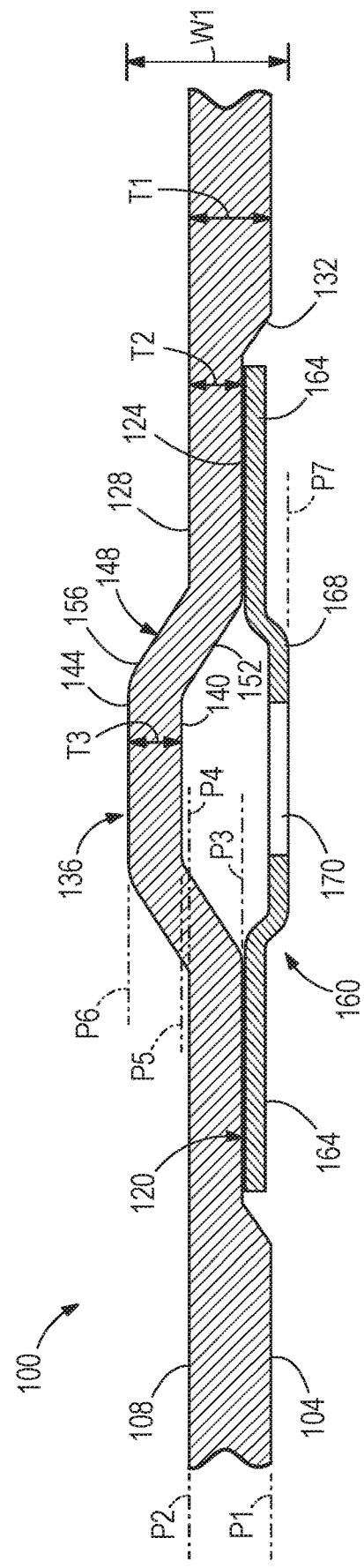
FIG. 4 is a cross-sectional view of the panel taken along line 4-4 of FIG. 3.

FIGS. 3 and 4 illustrate a panel 100 for a cargo body. For example, the panel 100 may be used in constructing an over-the-road semi-trailer 10 like that of FIG. 1. In particular, the construction of the panel 100 may be applied to the longitudinal sidewalk of the trailer 10 in the travel direction. Aspects of the invention are not necessarily limited to semi-trailers like that of FIG. 1, and other trailer and cargo body configurations are understood as optional.

Referring to FIG. 4, the panel 100 includes an interior side 104 and an exterior side 108, together defining a panel length L1, a panel height H1, and a panel width W1. The length L1 of the panel 100 is measured between two opposed edges 174 thereof. The interior side 104 faces the cargo receiving volume of the trailer 10. The exterior side 108 is opposite and spaced from the interior side 104, such that the exterior side 108 faces the exterior of the trailer 10. The interior side 104 defines an interior plane P1 and the exterior side 108 defines an exterior plane P2. A distance between the interior plane P1 and the exterior plane P2 defines a nominal thickness T1. The panel 100 can have a solid or semi-hollow construction. As such, the interior side 104 and the exterior side 108 may refer to two opposing sides of a monolithic material, or separate skins for example that sandwich a core therebetween, thus forming a composite panel construction.

The panel 100 further includes a primary recess 120. In some embodiments, the panel 100 may include multiple primary recesses 120 disposed along regular or irregular intervals along the panel length L1. In the depicted embodiment, the primary recess 120 spans the entirety of the height H1 of the panel 100, although, in additional embodiments, the primary recess 120 may be formed to span only a portion of the panel height H1, e.g., a majority portion. The primary recess 120 includes a primary recess interior side 124, which faces the cargo receiving volume of the trailer 10, and a primary recess exterior side 128, which faces the exterior of the trailer 10. The primary recess interior side 124 is spaced apart from the primary recess exterior side 128, such that a distance therebetween defines a primary recess thickness T2. The primary recess interior side 124 defines a primary recess interior plane P3 and the primary recess exterior side 128 defines a primary recess exterior plane P4.

The primary recess interior plane P3 is recessed from the interior plane P1 in a direction toward the exterior side 108. The primary recess interior side 124 is coupled to the interior side 104 of the panel 100 via a transition wall 132. The transition wall 132 is angled, oblique or skew, in cross-section view, as shown in FIG. 4. The primary recess exterior plane P4 is co-planar with the exterior plane P2. In other words, the exterior plane P2 is the same plane as the primary recess exterior plane P4. The thickness of the panel 100 along the transition wall 132 decreases such that the nominal thickness T1 is greater than the primary recess thickness T2. The primary recess thickness T2 is reduced, when compared with the nominal thickness T1, by 0.01-0.19 inches.

The panel 100 further includes a secondary recess 136 positioned within the primary recess 120. In the illustrated embodiment, one and only one secondary recess 136 is disposed in the primary recess 120. The secondary recess 136 is positioned along a lengthwise center of the primary recess 120, as illustrated. In other embodiments, the secondary recess 136 may be offset from the lengthwise center of the primary recess 120. The secondary recess 136 is continuous through the panel height H1, such that the secondary recess 136 spans the entirety of the panel height H1. In additional embodiments, the secondary recess 136 may span only a portion of the panel height H1, e.g., a majority portion, although not extending all the way to one or both lengthwise ends of the panel 100. The secondary recess 136 includes a secondary recess interior side 140, which faces the cargo receiving volume of the trailer 10, and a secondary recess exterior side 144, which faces the exterior of the trailer 10. The secondary recess interior side 140 is spaced apart from the secondary recess exterior side 144 to define a secondary recess thickness T3. The secondary recess interior side 140 defines a secondary recess interior plane P5 and the secondary recess exterior side 144 defines a secondary recess exterior plane P6.

The secondary recess interior plane P5 is recessed from the primary recess interior plane P3 in a direction away from the interior plane P1. The secondary recess interior plane P5 is non-coplanar with the exterior plane P2 such that a distance between the secondary recess interior plane P5 and the interior plane P1 is greater than the distance between the exterior plane P2 and the interior plane P1. In other words, the secondary recess interior side 140 is also recessed from the exterior plane P2 in a direction toward the exterior of the cargo body. The secondary recess exterior plane P6 is offset from the primary recess exterior plane P4 in a direction away from the interior plane P1. As the primary recess exterior plane P4 is co-planar with the exterior plane P2 in the illustrated construction, the secondary recess exterior plane P6 is also offset from the exterior plane P2 in a direction away from the interior plane P1. Thus, a distance between the secondary recess exterior plane P6 and the interior plane P1 is greater than a distance between the interior plane P1 and either of the exterior plane P2 or the primary recess exterior plane P4.

The secondary recess 136 is coupled to the primary recess 120 with a transition portion 148. The transition portion 148 includes a transition portion interior side 152 facing the cargo receiving volume, and a transition portion exterior side 156 facing the exterior of the trailer 10. The transition portion interior side 152 and the transition portion exterior side 156 are parallel, such that a transition portion thickness T4 between the transition portion interior side 152 and the transition portion exterior side 156 does not change throughout the transition portion 148. The transition portion 148 is angled, oblique, or skew, in cross-section view, as shown in FIG. 4. In other words, the transition portion 148 recesses the secondary recess 136 from the primary recess 120. In the illustrated embodiment, the primary recess thickness T2, the secondary recess thickness T3, and the transition portion thickness T4 are the same (i.e., there is no change in wall thickness among the primary recess 120, the secondary recess 136, and the transition portion 148).

The panel 100 further includes a logistics track 160. The logistics track 160 includes lateral portions 164 supported by the primary recess interior side 124. The logistics track 160 spans the secondary recess 136. The logistics track 160 includes a central portion 168 disposed over the secondary recess 136. The central portion 168 is protruded from the lateral portions 164 in a direction away from the secondary recess 136 such that additional space is formed between the logistics track 160 and the secondary recess 136. The central portion 168 defines a central portion plane P7. A distance between the central portion plane P7 and the secondary recess interior plane P5 is greater than a distance between the primary recess interior plane P3 and the secondary recess interior plane P5. The central portion 168 includes apertures 170 (e.g., forming a row parallel to the height H1) extending through a thickness of the central portion 168. The apertures 170 are positioned at a center of the central portion 168 although, in some embodiments, the apertures 170 may be offset (e.g., there may be more than one row of apertures). The apertures 170 provide access to the space formed between the logistics track 160 and the secondary recess 136. In the illustrated embodiment, the logistics track 160 is continuous through the height of the primary recess 120 although, in some embodiments, the logistics tack 160 may not span the entire height of the primary recess 120.

Figure 5:
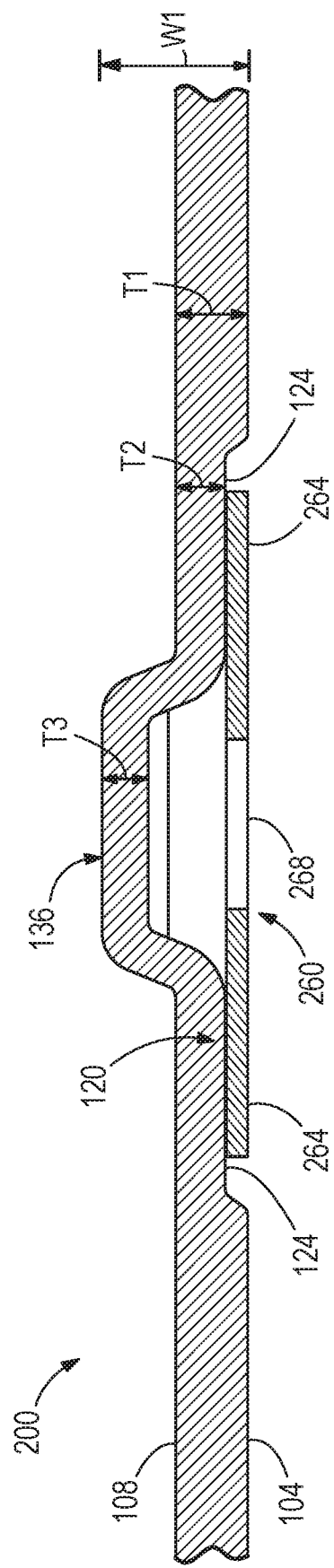
FIG. 5 is a cross-sectional view of a panel similar to that shown in FIG. 4 with a flat logistics track.

FIG. 5 illustrates another panel 200. The panel 200 is similar to the panel 100 described above, and the below description is focused on particular differences between the panel 200 and the panel 100 of FIGS. 3-4. The panel 200 includes a logistics track 260 with lateral sections 264 and a central portion 268 disposed between the lateral sections 264. The lateral sections 264 are planar with the central portion 268. In other words, the logistics track 260 is not profiled, or is flat, in the illustrated cross-section taken perpendicular to the panel height H1. The logistics track 260 does not protrude beyond the interior side 104. Rather, the logistics track 260 is flush with the interior side 104, or may even be recessed therefrom. The lateral sections 264 are supported by the primary recess interior side 124. The logistics track 260 spans the secondary recess 136. In the illustrated embodiment, the logistics track 260 is continuous through the height of the primary recess 120, although, in some embodiments, the logistics tack 260 may not span the entirety of the height of the primary recess 120.

Prior to attachment of the logistics track 160, 260, via bonding, the panel 100 or 200 may be formed into shape by a shaping operation of die pressing, stamping, etc. from a flat sheet. The primary recess 120 and the secondary recess 136 can be formed exclusively by shaping operations, without cutting, milling or other subtractive processes, including the displacement of the secondary recess interior surface 140 from an original position at the interior plane P1 to a final position at the secondary recess interior plane P5, being outward of the interior plane P1. In some constructions, the secondary recess interior plane P5 is even outward of the exterior plane P2. The panel(s) 100, 200 can be a composite structure, as illustrated in U.S. application Ser. No. 16/458, 706 filed on Jul. 1, 2019 and U.S. Pat. No. 9,884,660 filed on Feb. 6, 2018, the entire contents of which are hereby incorporated by reference. In some embodiments, the panel(s) 100, 200 can be constructed of alternate forms and/or materials, including monolithic metal bodies, and monolithic non-metallic materials, for example. A trailer wall is constructed by joining together a plurality of the panels 100, 200, or variations thereof, end-to-end in the direction of the panel length L1. Panel-to-panel joints can be made in any desired manner, including splice joints, lap joints, etc., and the joints may utilize mechanical fasteners such as screws and/or rivets.

Figure 6:
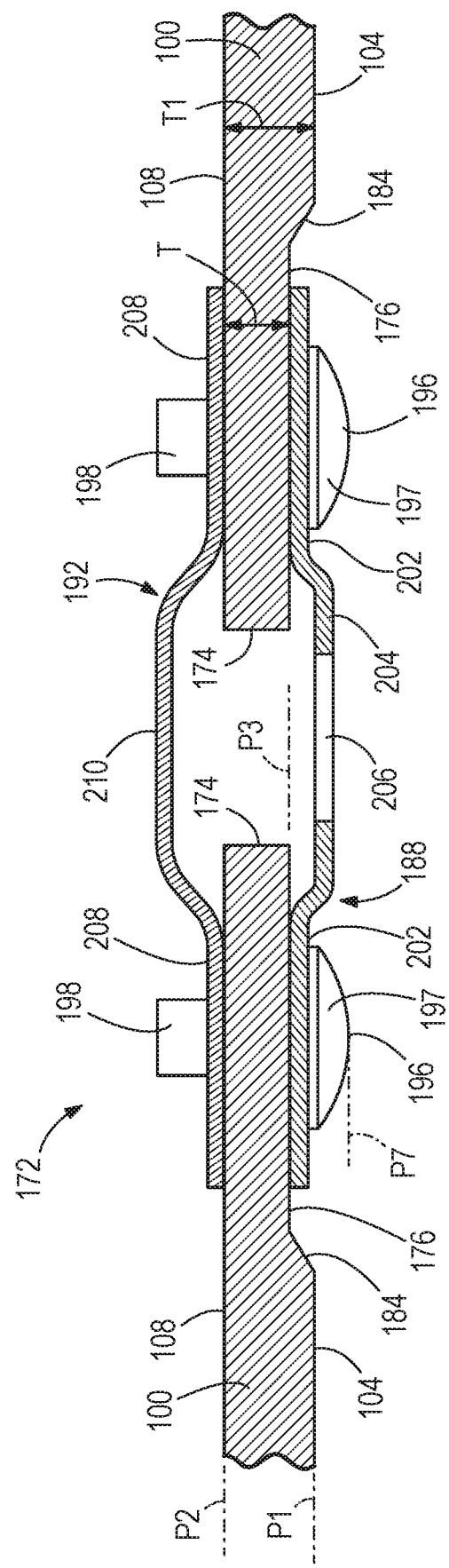
FIG. 6 is a cross-sectional view of a joint formed at the edge of the panel of FIG. 3.

FIG. 6 illustrates two of the panels 100 coupled via one exemplary joint 172. The joint 172 is formed between adjacent ends or edges 174 of the panels 100. In the depicted embodiment, the joint 172 spans the entirety of the height of the panel 100, although, in additional embodiments, the joint 172 may span solely a portion of the panel 100. Similar to the primary recess 120, each panel 100 includes an edge recess 176, which faces the cargo receiving volume of the trailer 10. The edge recess 176 may lie within the primary recess interior plane P3. The thickness of the panel 100 along a transition wall 184 gradually decreases such that the nominal thickness T1 decreases to a thickness T, which may be the same as the primary recess thickness T2. In additional embodiments, the thickness T between the edge recess 176 and the exterior plane P2 may be less than or greater than the primary recess thickness T2.

The joint 172 between adjacent panels 100 is made by an interior splice plate 188 and an exterior splice plate 192. The interior splice plate 188 is supported by the respective edge recesses 176 of the two panels 100. The exterior splice plate 192 is supported by the exterior sides 108 of the adjacent panels 100. Fasteners 196 secure the interior splice plate 188 to the exterior splice plate 192 such that two of the panels 100 are secured therebetween in a sandwich configuration. In this position, a space is formed between the respective edges 174 of the panels 100. The fastener 196 includes a head 197 extending from the edge recess 176, and a stem or shank 198 extending from the exterior side 108. As illustrated, the fastener 196 may be an unformed rivet, ready for final plastic deformation. The head 197 extends inwardly no further than the central portion plane P7 and may lie directly in the plane P7. The interior splice plate 188 includes lateral portions 202 supported by the edge recesses 176 and a central portion 204 disposed over the space formed between the ends 174 of the two panels 100. The interior splice plate 188 is positioned such that the central portion 204 extends toward the interior side 104 of the cargo body. In some embodiments, the interior splice plate 188 may include apertures 206 formed along the central portion 204, allowing the interior splice plate 188 to function as a logistics track. The exterior splice plate 192 includes lateral portions 208 supported by the external sides 108 of the panels 100 and a central portion 210 disposed over the space formed between the ends 174 of the two panels 100. The exterior splice plate 192 is mirrored with the interior splice plate 188. In other words, the central portion 210 of the exterior splice plate 192 protrudes toward the exterior of the cargo body.

Figure 7:
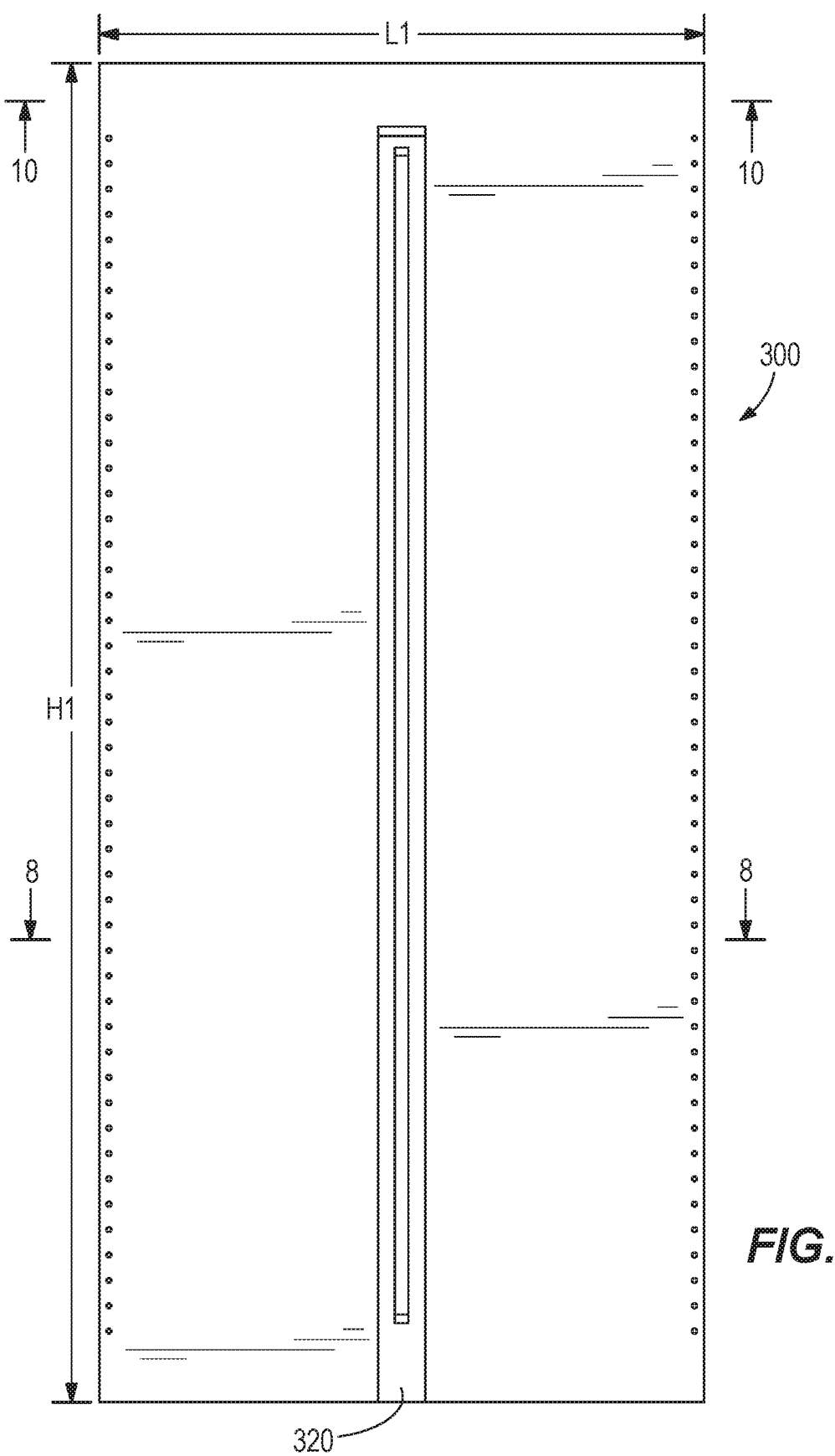
FIG. 7 is a front view of a panel according to another embodiment of the invention.
Figure 8:
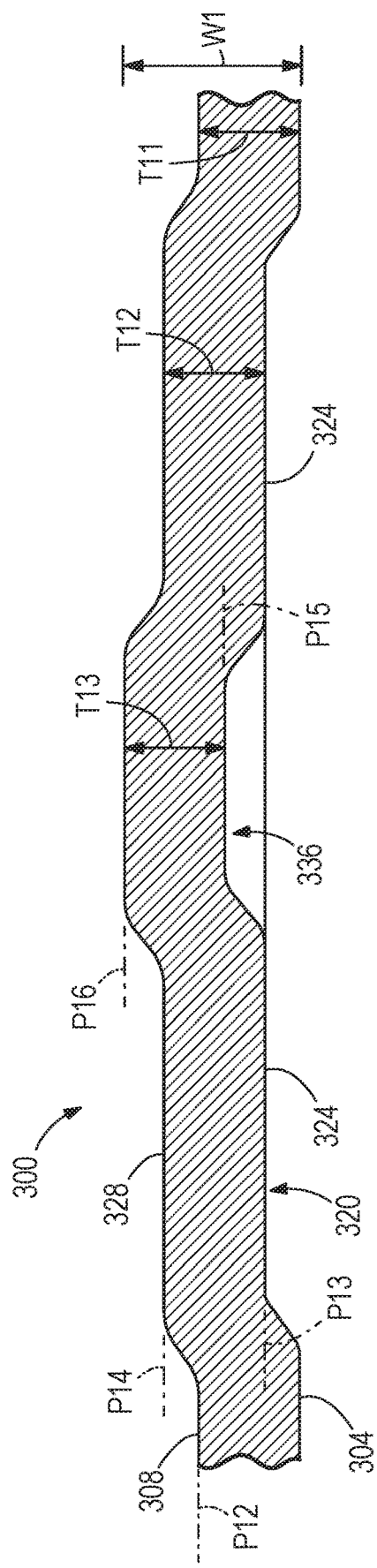
FIG. 8 is a cross-sectional view of the panel of FIG. 7.

FIGS. 7-10 illustrate an alternate panel 300 according to another embodiment of the invention. The panel 300 includes an interior side 304 and an exterior side 308. As shown in FIG. 8, a primary recess 320 and a secondary recess 336 similar to the primary recess 120 and secondary recess 136 of the panel 100 FIG. 4 are formed in the panel 100. The primary recess 320 of FIG. 8 differs from the primary recess 120 of FIG. 4 in that the primary recess 320 includes a primary recess exterior side 328 that defines a primary recess exterior plane P14 that is non-coplanar with an exterior plane P12 defined by the exterior side 308. In other words, the primary recess exterior side 328 is bulged or projected from the exterior side 308 in a direction toward the exterior of the panel 300. In addition, the primary recess 320 of FIG. 8 differs from the primary recess 120 of FIG. 4 in that a primary recess thickness T12, as defined between the primary recess exterior plane P14 and a primary recess interior plane P13, is the same as a nominal thickness T11 of the panel 300.

The panel 300 further includes the secondary recess 336 similar to the secondary recess 136 of the panel 100 FIG. 4. The secondary recess 336 differs in that the secondary recess 136 includes a secondary recess thickness T13, as defined between a secondary recess interior plane P15 and a secondary recess exterior plane P16, that is the same as the nominal thickness T11. As a result, the secondary recess interior plane P15 is not to the exterior side of the exterior plane P12 but rather lies between the interior and exterior sides 304, 308. In some embodiments, the secondary recess interior plane P15 may lie outside the exterior plane P12.

Figure 9:
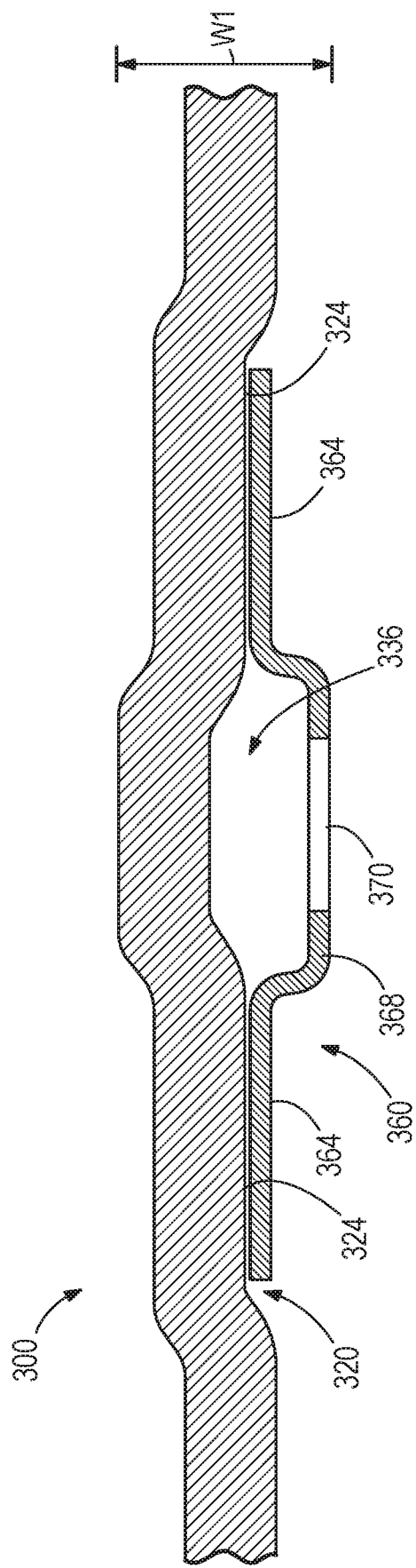
FIG. 9 is a cross-sectional view of the panel of FIG. 7.

Similar to the panel 100 of FIG. 4, the panel 300 further includes a logistics track 360 as shown in FIG. 9. The logistics track 360 includes lateral portions 364 supported by a primary recess interior side 324. The logistics track 360 spans the secondary recess 336. The logistics track 360 includes a central portion 368 disposed over the secondary recess 336. The central portion 368 is protruded from the lateral portions 364 in a direction away from the secondary recess 336 such that additional space is formed between the logistics track 360 and the secondary recess 336. In some embodiments, the central portion 368 may include apertures 370 (e.g., forming a row) extending through a thickness of the logistics track 360, providing access to the space formed between the logistics track 360 and the secondary recess 336. As apparent from the configuration of the primary recess 320 shown in FIG. 7, the logistics track 360 does not span the entirety of the panel height H1. In other embodiments, the logistics track 360 may span the entirety of the panel height H1. In some embodiments, the logistics track 360 may not include a protruded central portion 368. In other words, the panel 300 can include a logistics track 360 that is flat.

Figure 10:
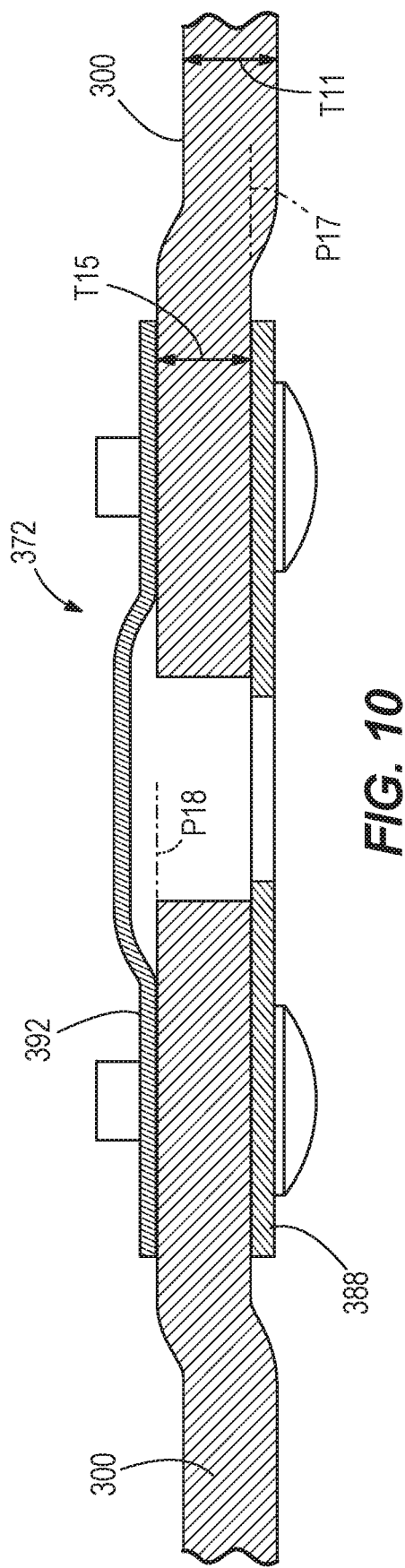
FIG. 10 is a cross-sectional view of the panel of FIG. 7.

FIG. 10 illustrates two of the panels 300 of the embodiment of FIG. 7 coupled via a joint 372. The joint 372 is similar to the joint 172 of FIG. 6. The joint 372 differs from the joint 172 of FIG. 6 in that the edges of the panels 300 are offset so as to define exterior sides that protrude from the exterior plane P12 in a direction toward the exterior of the panel 300. The joint 372 also differs in that a panel edge thickness T15, as defined between an edge interior plane P17 and an edge exterior plane P18 is the same as the nominal thickness T11. Securing the joint 372 are an interior splice plate 388 and an exterior splice plate 392. The exterior splice plate 392 can have a construction that is the same as or similar to the exterior splice plate 192 shown in FIG. 6, and reference is hereby made to the preceding description. The interior splice plate 388 differs from the interior splice plate 188 of FIG. 6 in that the interior splice plate 388 does not include a protruded central portion. In other words, the interior splice plate 388 is flat. In additional embodiments, the interior splice plate 388 may include an offset central portion, similar to the interior joint logistics track 188 of FIG. 6. In additional embodiments, the joint 372 may be identical to the joint 172 illustrated in FIG. 6.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. Various features of the invention are set forth in the following claims.

What is claimed is:

1. A cargo body panel comprising:
an interior side defining an interior plane of the cargo body panel for facing a cargo receiving volume of a cargo body constructed with the cargo body panel;
an exterior side defining an exterior plane of the cargo body panel, wherein the exterior side is spaced apart from the interior side;
a primary recess including a primary recess interior side defining a primary recess interior plane and a primary recess exterior side defining a primary recess exterior plane, wherein the primary recess interior plane is recessed from the interior plane in a direction toward the exterior plane;
a secondary recess positioned within the primary recess, the secondary recess including a secondary recess interior side defining a secondary recess interior plane and a secondary recess exterior side defining a secondary recess exterior plane, wherein a distance between the secondary recess interior plane and the interior plane is greater than a distance between the primary recess interior plane and the interior plane, and wherein the secondary recess exterior plane is non-coplanar with the exterior plane; and
a logistics track including lateral portions supported by the primary recess interior side, the logistics track spanning the secondary recess,
wherein the distance between the interior plane and the secondary recess interior plane is less than a distance between the interior plane and the exterior plane.

2. The cargo body panel of claim 1, wherein the primary recess exterior plane is planar with the exterior plane.

3. The cargo body panel of claim 1, wherein a distance between the primary recess exterior plane and the interior plane is greater than a distance between the exterior plane and the interior plane.

4. The cargo body panel of claim 1, wherein the panel has a thickness within the primary recess as measured between the primary recess interior side and the primary recess exterior side, and the panel has a thickness within the secondary recess as measured between the secondary recess interior side and the secondary recess exterior side, and wherein the thickness at the primary recess is equal to the thickness at the secondary recess.

5. The cargo body panel of claim 4, wherein the thickness at the primary recess is equal to a nominal thickness of the cargo body panel measured outside the primary recess between the interior and exterior planes.

6. The cargo body panel of claim 4, wherein the thickness at the primary recess is less than a nominal thickness of the cargo body panel measured outside the primary recess between the interior and exterior planes.

7. The cargo body panel of claim 1, wherein the logistics track includes a central portion disposed over the secondary recess, wherein the central portion is protruded from the lateral portions in a direction away from the secondary recess such that additional space is formed between the logistics track and the secondary recess.

8. A cargo body panel comprising:
an interior side for facing a cargo receiving volume of a cargo body constructed with the cargo body panel;
an exterior side spaced from the interior side;
a primary recess including a primary recess exterior side and a primary recess interior side recessed from the interior side, wherein the distance between the primary recess interior side and the primary recess exterior side defines a thickness;
a secondary recess positioned within the primary recess, the secondary recess including a secondary recess interior side and a secondary recess exterior side, wherein a distance between the secondary recess interior side and the secondary recess exterior side defines a thickness, and wherein the thickness is equal to a thickness of the cargo body panel at the primary recess measured between the primary recess interior side and the primary recess exterior side, and wherein a distance between the interior side and the primary recess interior side is less than a distance between the interior side and the secondary recess interior side; and
a logistics track including lateral portions supported by the primary recess interior side and a central portion spanning the secondary recess, wherein the logistics track is not in contact with the secondary recess interior side,
wherein the thickness of the cargo body panel at the primary recess is equal to a nominal thickness of the cargo body panel measured outside the primary recess between the interior and exterior sides.

9. The cargo body panel of claim 8, wherein the central portion of the logistics track is protruded from the lateral portions in a direction away from the secondary recess such that additional space is formed between the logistics track and the secondary recess.

10. The cargo body panel of claim 8, wherein the central portion is protruded from the lateral portions in a direction away from the secondary recess such that additional space is formed between the logistics track and the secondary recess.

11. The cargo body panel of claim 8, wherein the secondary recess exterior side protrudes from the exterior side.

12. The cargo body panel of claim 1, wherein the primary and secondary recesses are located away from both of a pair of opposed edges of the cargo body panel.

13. The cargo body panel of claim 8, wherein the primary and secondary recesses are located away from both of a pair of opposed edges of the cargo body panel.

14. A cargo body panel comprising:
an interior side defining an interior plane of the cargo body panel for facing a cargo receiving volume of a cargo body constructed with the cargo body panel;
an exterior side defining an exterior plane of the cargo body panel, wherein the exterior side is spaced apart from the interior side;
a primary recess including a primary recess interior side defining a primary recess interior plane and a primary recess exterior side defining a primary recess exterior plane, wherein the primary recess interior plane is recessed from the interior plane in a direction toward the exterior plane;
a secondary recess positioned within the primary recess, the secondary recess including a secondary recess interior side defining a secondary recess interior plane and a secondary recess exterior side defining a secondary recess exterior plane, wherein a distance between the secondary recess interior plane and the interior plane is greater than a distance between the primary recess interior plane and the interior plane, and wherein the secondary recess exterior plane is non-coplanar with the exterior plane; and
a logistics track including lateral portions supported by the primary recess interior side, the logistics track spanning the secondary recess,
wherein the panel has a thickness within the primary recess as measured between the primary recess interior side and the primary recess exterior side, and the panel has a thickness within the secondary recess as measured between the secondary recess interior side and the secondary recess exterior side, and
wherein the thickness at the primary recess is equal to the thickness at the secondary recess and equal to a nominal thickness of the cargo body panel measured outside the primary recess between the interior and exterior planes.

\* \* \* \* \*